United States Patent
Wilkinson

(10) Patent No.: US 10,160,918 B2
(45) Date of Patent: Dec. 25, 2018

(54) PREFLASH ARRANGEMENTS AND FEEDSTOCK MULTIPLE INJECTION IN A PROCESS FOR DISTILLATION OF CRUDE OIL

(71) Applicant: SHELL OIL COMPANY, Houston, TX (US)

(72) Inventor: Peter Mervyn Wilkinson, Amsterdam (NL)

(*) Notice: Subject to any disclaimer, the term of this patent is extended or adjusted under 35 U.S.C. 154(b) by 195 days.

(21) Appl. No.: 14/368,615

(22) PCT Filed: Dec. 21, 2012

(86) PCT No.: PCT/EP2012/076846
§ 371 (c)(1),
(2) Date: Jun. 25, 2014

(87) PCT Pub. No.: WO2013/098270
PCT Pub. Date: Jul. 4, 2013

(65) Prior Publication Data
US 2015/0152337 A1   Jun. 4, 2015

(30) Foreign Application Priority Data
Dec. 27, 2011   (EP) .................................... 11195793

(51) Int. Cl.
*C10G 7/00* (2006.01)
*B01D 3/06* (2006.01)

(52) U.S. Cl.
CPC ................. *C10G 7/00* (2013.01); *B01D 3/06* (2013.01)

(58) Field of Classification Search
CPC . B01D 1/00; B01D 3/00; B01D 3/143; B01D 3/38; B01D 3/065; B01D 3/146;
(Continued)

(56) References Cited

U.S. PATENT DOCUMENTS 2,338,595 A    1/1944  Packie
3,310,487 A *  3/1967  Johnson .................. B01D 3/143
                                                     196/106
(Continued)

OTHER PUBLICATIONS

Fahim, M.A. et al.; "Crude Distillation"; Fundamentals of Petroleum Refining; pp. 89-91; Chapater 4; Dec. 31, 2010.

*Primary Examiner* — Randy Boyer
*Assistant Examiner* — Juan Valencia
(74) *Attorney, Agent, or Firm* — Charles W. Stewart

(57) ABSTRACT

The invention relates to a process for distillation of crude oils comprising i) passing a hydrocarbon crude oil into a preflash vessel maintained under conditions to separate the crude oil into a preflash liquid and a preflash vapor, ii) passing the pre-flash liquid into a furnace maintained under conditions to heat and partially vaporize the preflash liquid, iii) passing the heated furnace effluent into the lower part of a distillation column maintained under fractionating conditions, iv) passing the preflash vapor into the distillation column in a zone at the bottom of a stripping zone located below the introduction zone of the furnace effluent, and v) passing steam into the distillation column in a zone at the bottom of the stripping zone, such that liquid furnace effluent is contacted with steam and preflash vapor in the stripping zone under conditions sufficient to strip the liquid furnace effluent.

6 Claims, 2 Drawing Sheets

Figure 1:
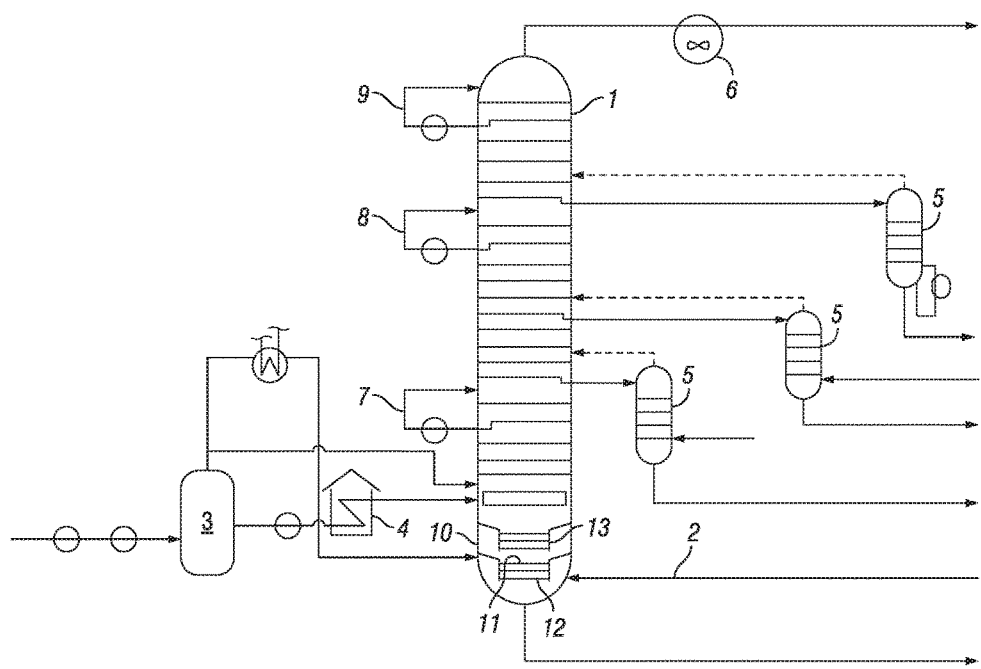

(58) Field of Classification Search
CPC .... B01D 3/10; B01D 3/26; B01D 3/06; C02F 1/046; C02F 1/12; C10G 7/00
See application file for complete search history.

(56) References Cited

U.S. PATENT DOCUMENTS

| | | | | |
|---|---|---|---|---|
| 3,320,158 | A * | 5/1967 | Potts | B01D 3/4222 |
| | | | | 159/18 |
| 4,082,653 | A * | 4/1978 | DeGraff | C10G 7/00 |
| | | | | 208/251 R |
| 6,087,662 | A * | 7/2000 | Wilt | G01N 33/2823 |
| | | | | 250/339.09 |
| 7,172,686 | B1 | 2/2007 | Ji et al. | |
| 2011/0168523 | A1* | 7/2011 | Sawai | C10G 7/00 |
| | | | | 196/46 |
| 2011/0268523 | A1* | 11/2011 | Heinemann | B23F 5/163 |
| | | | | 409/12 |

* cited by examiner

PREFLASH ARRANGEMENTS AND FEEDSTOCK MULTIPLE INJECTION IN A PROCESS FOR DISTILLATION OF CRUDE OIL

PRIORITY CLAIM

The present application is the National Stage (§ 371) of International Application No. PCT/EP2012/076846, filed Dec. 21, 2012, which claims priority from European application no. 11195793.2, filed Dec. 27, 2011, the disclosures of which are incorporated herein by reference.

The invention relates to the distillation of crude oils.

The first step in any petroleum refinery is the separation of crude oil into various fractions by distillation, in a so-called Crude Distillation Unit (CDU).

Typical CDU's have a preflash vessel upstream of the furnace of the CDU. The vapor leaving the preflash vessel is normally bypassing the furnace and is routed into the main distillation column at either the same location as the main feed line coming from the furnace, or at a higher point in the distillation column. Below the feed inlet there is normally a 'stripping' zone where steam is used. This improves gasoil recovery. The disadvantage of the use of steam is that it adds to the column loads and required column diameter. Furthermore it leads to additional sour water production and potential dew-point corrosion problems in the top of the column and operating constraints.

The present invention provides an improved process for the distillation of crude oils wherein the amount of steam is substantially reduced. In this process, the preflash vapor is entering the distillation column of the CDU at a zone below the feed inlet. In this way, the preflash vapor is used as an additional stripping medium, resulting in a reduction of the required amount of steam, and thus also steam costs.

The process as described herein is a simplified process as compared to the process described in U.S. Pat. No. 4,082,653. This document describes a process wherein two flashing devices are used, the liquid produced in the first flash device being passed into a desalter and then into a second flash device, whereas the vapor produced in the first flash device being passed into the distillation column, optionally mixed with vapor produced in the second flash device. The first flash zone operates at a temperature of about 120° C. (265° F.). The vapor passed into the distillation column contains a substantial amount of water and/or steam as will be clear from the example in which the vapor contains 50% wt $H_2O$. Additionally, further steam is introduced via line 47.

Accordingly, there is provided a process for distillation of crude oils comprising i) passing a hydrocarbon crude oil into a preflash vessel maintained under conditions to separate the crude oil into a preflash liquid and a preflash vapor, ii) passing the preflash liquid into a furnace maintained under conditions to heat and partly vaporize the preflash liquid, iii) passing the heated furnace effluent into the lower part of a distillation column maintained under fractionating conditions, iv) passing the preflash vapor into the distillation column in a zone at the bottom of a stripping zone located below the introduction zone of the furnace effluent, and v) passing steam into the distillation column in a zone at the bottom of the stripping zone, such that the liquid furnace effluent is contacted with steam and preflash vapor in the stripping zone under conditions to strip the liquid furnace effluent.

FIG. 1 presents a process flow diagram illustrating an embodiment of the inventive process.

Figure 2:
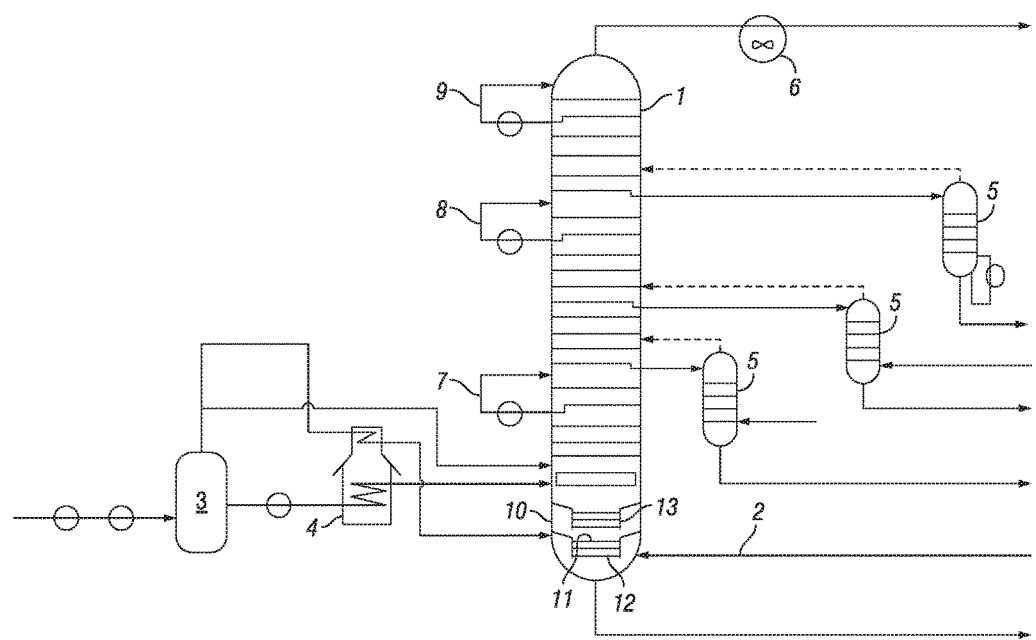

FIG. 2 presents a process flow diagram illustrating another embodiment of the inventive process.

An embodiment of the process as described herein is shown in FIG. 1.

Crude oil distillation units are well known in the art and many are commercially available.

A crude oil distillation unit typically comprises several components. The core of the unit is the main atmospheric distillation column (1), where the primary fractionation of the crude oil takes place. Steam is introduced into the column's bottom part (2) for stripping purposes. The unit further comprises a preflash vessel (3) and a furnace (4), both located upstream of the distillation column (1). Several side stream strippers (5) are usually connected to the main distillation column (1) for recovering various fractions, such as kerosene (kero stripper) and gasoil (e.g. gasoil strippers for LGO and HGO). A naphtha splitter is usually present for recovering the naphtha fraction, whilst a debutanizer is used for recovery of the C3 and C4 hydrocarbon gases. The reflux arranged at the top of the main distillation column usually comprises a condenser (6) and a reflux drum. A lower (7), mid (8) and top (9) circulation reflux may be operated with the column (1) for heat removal. Finally, the residue leaving the bottom of the distillation column, known as the long residue (LR), may be further processed in, for instance, a high vacuum unit (HVU).

Before introduction into the distillation column (1), the crude oil is first treated in the preflash vessel (3) under conditions to separate said crude oil into a preflash liquid and a preflash vapor. Suitable conditions are commonly known to those skilled in the art and can vary substantially depending on the nature of the crude oil and the design of the unit. Typical preflash vessel operating pressures are in the range from 1 barg to 5 barg, while the typical temperature varies between 110° C. and 200° C. Preferably, the temperature in the preflash vessel is at least 130° C., more specifically, at least 140° C., more specifically at least 150° C., most preferably at least 160° C. A high flash temperature allows a larger part of the crude oil to be used for stripping in the distillation column.

The preflash liquid leaving the preflash vessel subsequently is passed into the furnace, wherein it is heated and partially vaporized, at a temperature in the range from 340° C. to 380° C., depending on the crude oil and on the residue needed, also as is typically known to those skilled in the art.

The effluent leaving the furnace (4) is passed into the distillation column (1) in a zone at the lower part of the column. Below the inlet (10) of the furnace effluent is a stripping zone (11), and steam is introduced into the distillation column (1) in a zone at the bottom of the stripping zone (12), as a stripping medium to improve gasoil recovery.

The preflash vapor is also passed into the distillation column (1). In particular, the preflash vapor is also introduced into the distillation column (1) in a zone at the bottom of the stripping zone (12). In this way, the preflash vapor advantageously functions as a stripping medium, in addition to the steam.

The preflash vapor preferably contains at most 40% wt of water and/or steam, more preferably less than 40% wt, more specifically less than 30% wt, more specifically less than 20% wt, more specifically less than 10% wt of water, based on total amount of preflash vapor. Most preferably, the preflash vapor contains no water. The reduced amount of water and/or steam added to the distillation column increases the efficiency of the distillation system.

In one embodiment, as illustrated in the embodiment of FIG. 1, part of the preflash vapor may be passed into the distillation column (1) in the zone where the furnace effluent is introduced, for instance when the amount of preflash vapor is too high for stripping purposes.

For proper stripping, the stripping medium should be predominantly in the vapor phase under the conditions prevailing in the stripping zone. Most molecules/components in the preflash vessel vapor meet this criterion and are sufficiently light to remain predominantly in the vapor phase in the stripping zone. However, the heaviest part (or components with the highest boiling points) of the preflash vapor may be less suitable to remain in the vapor phase and can thus condense in the long residue. In comparison to the preflash vapor, steam is a better stripping medium as it will not condense in the stripping zone and the water solubility under these conditions is also extremely low.

Therefore, in one embodiment, as illustrated in the embodiment of FIG. 1, the stripping zone preferably comprises a lower (12) and an upper (13) stripping zone, where the preflash vapor is used for 'pre' stripping in the upper stripping zone and the final stripping is done in the lower stripping zone with steam.

The stripping zone(s) preferably contain(s) a number of trays, preferably 4 to 8 trays, or a packing.

As a consequence of using the preflash vapor as a stripping medium, the amount of steam used can be substantially reduced. The reduction of amount of steam has several associated benefits such as: reduction of vapor load in the column, reduction of sour water production (due to less steam being condensed), dew-point margin is increased due to the lower water vapor pressure in the column thus limiting potential dew-point corrosion problems. Due to the increase of the dew-point margin it is also possible to operate at a lower column overhead temperature while maintain sufficient margin relative to the water dew-point temperature, this adds to operating flexibility and can allow for a lower naphtha final boiling point while maintaining sufficient margin relative to the water dew-point temperature.

In one embodiment, as illustrated in the embodiment of FIG. 1, the preflash vapor leaving the preflash vessel (3) is directly passed into the distillation column (1), while bypassing the furnace. Alternatively, the preflash vapor leaving the preflash vessel (3) may firstly be heated in the furnace convection bank to improve the stripping effect of the preflash vapor, or, alternatively, a different heating medium may be used such as high pressure steam, or hot-oil.

The fractions leaving the main distillation column (1) at various locations are further processed as desired. As mentioned above, several side stream strippers (5) are usually connected to the main distillation column (1) for recovering various fractions, such as kerosene (kero stripper) and gasoil (gasoil stripper). A naphtha splitter is usually present for recovering the naphtha fraction, whilst a debutanizer is used for recovery of the C3 and C4 hydrocarbon gases. The reflux arranged at the top of the main distillation column usually comprises a condenser (6) and a reflux drum. Finally, the residue leaving the bottom of the distillation column, known as the long residue, may be further processed in a high vacuum unit (HVU).

That which is claimed is:
1. A process for distillation of a crude oil comprising
    i) passing a hydrocarbon crude oil into a preflash vessel operated at a pressure of from 1 barg to 5 barg and a temperature between 140° C. and 200° C. and maintained under conditions to separate the crude oil into a preflash liquid and a preflash vapor,
    ii) passing the preflash liquid into a furnace maintained under conditions to heat and partially vaporize the preflash liquid to yield a heated furnace effluent,
    iii) passing the heated furnace effluent into an introduction zone located above a stripping zone comprising an upper stripping zone and a lower stripping zone in the lower part of a distillation column maintained under fractionating conditions and containing a number of trays,
    iv) heating the preflash vapor either in the furnace convection bank or by high pressure steam followed by passing the preflash vapor into the upper stripping zone below the introduction zone of the distillation column, and
    v) passing steam into the lower stripping zone of the distillation column such that the heated furnace effluent is contacted with steam and preflash vapor in the stripping zone under conditions sufficient to strip the liquid furnace effluent.
2. The process according to claim 1, wherein the preflash vapor is heated in the furnace convection bank prior to passing it into the distillation column.
3. The process according to claim 1, wherein the preflash vapor is heated by high pressure steam or hot oil prior to passing it into the distillation column.
4. The process according to claim 1, wherein part of the preflash vapor is passed into the distillation column in the introduction zone of the furnace effluent.
5. The process according to claim 1, wherein the stripping zone comprises a lower and an upper stripping zone, steam is introduced in a zone at the bottom of the lower stripping zone and the preflash vapor is introduced in a zone at the bottom of the upper stripping zone.
6. The process according to claim 5, wherein the preflash vapor contains at most 40% wt of water and/or steam.

* * * * *